(12) United States Patent
Papadopoulos et al.

(10) Patent No.: US 8,291,121 B2
(45) Date of Patent: *Oct. 16, 2012

(54) SYSTEM AND METHOD FOR INTERFACING WITH A CONTROLLER

(75) Inventors: A. Dean Papadopoulos, Groton, MA (US); Allan Tanzman, Newton, MA (US); Rodolfo G. Belliardi, Malden, MA (US); Richard A. Baker, Jr., West Newbury, MA (US); Dennis J. W. Dube, Pelham, NH (US)

(73) Assignee: Square D Company, Palatine, IL (US)

( * ) Notice: Subject to any disclaimer, the term of this patent is extended or adjusted under 35 U.S.C. 154(b) by 992 days.

This patent is subject to a terminal disclaimer.

(21) Appl. No.: 10/306,255

(22) Filed: Nov. 27, 2002

(65) Prior Publication Data

US 2003/0139821 A1 Jul. 24, 2003

Related U.S. Application Data

(63) Continuation of application No. 10/097,390, filed on Mar. 14, 2002, now abandoned, which is a continuation-in-part of application No. 08/927,005, filed on Sep. 10, 1997, now Pat. No. 6,282,454.

(51) Int. Cl.
*G06F 15/16* (2006.01)

(52) U.S. Cl. ............ 709/250; 709/217; 709/218; 700/9; 700/38; 700/67

(58) Field of Classification Search ............ 709/250, 709/217, 218
See application file for complete search history.

(56) References Cited

U.S. PATENT DOCUMENTS

| | | |
|---|---|---|
| 3,971,000 A | 7/1976 | Cromwell |
| 4,251,858 A | 2/1981 | Cambigue et al. |
| 4,308,991 A * | 1/1982 | Peinetti et al. .............. 236/46 R |
| 4,319,338 A | 3/1982 | Grudowski et al. |
| 4,669,040 A | 5/1987 | Pettit et al. |

(Continued)

FOREIGN PATENT DOCUMENTS

DE 44 10 171 C1 4/1995

(Continued)

OTHER PUBLICATIONS

"Java and Programmable Automation Controllers," CiMax: Edition Terrain, No. 13—May-Jun. 1997, in French, Certificate of Accuracy of translation from Merrill Corporation, dated May 19, 2004 and translated.

(Continued)

*Primary Examiner* — Backhean Tiv
(74) *Attorney, Agent, or Firm* — Banner & Witcoff, Ltd.

(57) ABSTRACT

A control system includes an Internet web interface to a network of at least one programmable logic control system running an application program for controlling output devices in response to status of input devices. The Web interface runs Web pages from an Ethernet board coupled directly to the PLC back plane and includes an HTTP protocol interpreter, a PLC back plane driver, a TCP/IP stack, and an Ethernet board kernel. The Web interface provides access to the PLC back plane by a user at a remote location through the Internet. The interface translates the industry standard Ethernet, TCP/IP and HTTP protocols used on the Internet into data recognizable to the PLC. Using this interface, the user can retrieve all pertinent data regarding the operation of the programmable logic controller system.

29 Claims, 4 Drawing Sheets

U.S. PATENT DOCUMENTS

| | | |
|---|---|---|
| 4,688,167 A | 8/1987 | Agarwal |
| 4,701,845 A | 10/1987 | Andreasen et al. |
| 4,845,644 A | 7/1989 | Anthias et al. |
| 4,858,152 A | 8/1989 | Estes |
| 4,897,777 A | 1/1990 | Janke et al. |
| 4,912,623 A | 3/1990 | Rantala et al. |
| 4,918,690 A | 4/1990 | Markkula, Jr. et al. |
| 4,937,777 A | 6/1990 | Flood et al. |
| 4,949,274 A | 8/1990 | Hollander et al. |
| 4,953,074 A | 8/1990 | Kametani et al. |
| 4,974,151 A | 11/1990 | Advani et al. |
| 4,979,107 A | 12/1990 | Advani et al. |
| 4,992,926 A | 2/1991 | Janke et al. |
| 5,012,402 A | 4/1991 | Akiyama |
| 5,023,770 A | 6/1991 | Siverling |
| 5,047,959 A | 9/1991 | Phillips et al. |
| 5,072,356 A | 12/1991 | Watt et al. |
| 5,072,412 A | 12/1991 | Henderson, Jr. et al. |
| 5,109,487 A | 4/1992 | Ohgomori et al. |
| 5,122,948 A | 6/1992 | Zapolin |
| 5,131,092 A | 7/1992 | Sackmann et al. |
| 5,134,574 A | 7/1992 | Beaverstock et al. |
| 5,151,896 A | 9/1992 | Bowman et al. |
| 5,151,978 A | 9/1992 | Bronikowski |
| 5,157,595 A | 10/1992 | Lovrenich |
| 5,159,673 A * | 10/1992 | Sackmann et al. ............ 709/216 |
| 5,161,211 A | 11/1992 | Taguchi et al. |
| 5,162,982 A | 11/1992 | Mentler |
| 5,165,030 A | 11/1992 | Barker |
| 5,179,700 A | 1/1993 | Aihara et al. |
| 5,225,974 A | 7/1993 | Mathews et al. |
| 5,245,704 A | 9/1993 | Weber et al. |
| 5,251,302 A | 10/1993 | Weigl et al. |
| 5,283,861 A | 2/1994 | Dangler et al. |
| 5,297,257 A | 3/1994 | Struger et al. |
| 5,307,463 A | 4/1994 | Hyatt et al. |
| 5,321,829 A | 6/1994 | Zifferer |
| 5,343,469 A | 8/1994 | Ohshima |
| 5,349,675 A | 9/1994 | Fitzgerald et al. |
| 5,386,524 A | 1/1995 | Lary et al. |
| 5,398,336 A | 3/1995 | Tantry et al. |
| 5,406,473 A | 4/1995 | Yoshikura et al. |
| 5,420,977 A | 5/1995 | Sztipanovits et al. |
| 5,430,730 A | 7/1995 | Sepulveda-Garese et al. |
| 5,440,699 A | 8/1995 | Farrand et al. |
| 5,446,868 A | 8/1995 | Gardea et al. |
| 5,471,617 A | 11/1995 | Farrand et al. |
| 5,472,347 A * | 12/1995 | Nordenstrom et al. ......... 439/61 |
| 5,528,503 A | 6/1996 | Moore et al. |
| 5,598,536 A | 1/1997 | Slaughter, III et al. |
| 5,611,059 A | 3/1997 | Benton et al. |
| 5,613,115 A * | 3/1997 | Gihl et al. ..................... 717/123 |
| 5,623,652 A | 4/1997 | Vora et al. |
| 5,625,781 A | 4/1997 | Cline et al. |
| 5,684,375 A | 11/1997 | Chaffee et al. |
| 5,699,350 A | 12/1997 | Kraslavsky |
| 5,734,831 A | 3/1998 | Sanders |
| 5,790,977 A | 8/1998 | Ezkiel |
| 5,793,954 A | 8/1998 | Baker et al. |
| 5,801,689 A | 9/1998 | Hntsman |
| 5,805,442 A * | 9/1998 | Crater et al. ..................... 700/9 |
| 5,842,039 A | 11/1998 | Hanaway |
| 5,862,391 A | 1/1999 | Salas et al. |
| 5,950,006 A | 9/1999 | Crater et al. |
| 5,973,696 A | 10/1999 | Agranat |
| 5,975,737 A | 11/1999 | Crater et al. |
| 5,982,362 A | 11/1999 | Crater et al. |
| 5,990,884 A | 11/1999 | Douma et al. |
| 5,997,167 A | 12/1999 | Crater et al. |
| 6,016,523 A | 1/2000 | Zimmerman et al. |
| 6,028,866 A | 2/2000 | Engel et al. |
| 6,032,203 A | 2/2000 | Heidhues |
| 6,058,251 A | 5/2000 | Okamoto et al. |
| 6,061,603 A * | 5/2000 | Papadopoulos et al. ........ 700/83 |
| 6,061,721 A | 5/2000 | Ismael et al. |
| 6,101,182 A | 8/2000 | Sistanizadeh et al. |
| 6,122,670 A | 9/2000 | Bennett et al. |
| 6,134,552 A | 10/2000 | Fritz et al. |
| 6,151,625 A * | 11/2000 | Swales et al. ................. 709/218 |
| 6,151,640 A | 11/2000 | Buda et al. |
| 6,201,996 B1 | 3/2001 | Crater et al. |
| 6,202,039 B1 * | 3/2001 | Finger ........................... 702/189 |
| 6,233,626 B1 | 5/2001 | Swales et al. |
| 6,263,487 B1 | 7/2001 | Stripf et al. |
| 6,282,454 B1 * | 8/2001 | Papadopoulos et al. ........ 700/83 |
| 6,311,101 B1 | 10/2001 | Kastner |
| 6,321,272 B1 * | 11/2001 | Swales ........................... 709/250 |
| 6,324,681 B1 | 11/2001 | Sebesta et al. |
| 6,327,511 B1 | 12/2001 | Naismith et al. |
| 6,370,550 B1 | 4/2002 | Douma et al. |
| 6,370,569 B1 | 4/2002 | Austin |
| 6,424,872 B1 | 7/2002 | Glanzer et al. |
| 6,434,157 B1 | 8/2002 | Dubè et al. |
| 6,453,210 B1 | 9/2002 | Belotserkovsky |
| 6,466,995 B2 | 10/2002 | Swales et al. |
| 6,484,061 B2 * | 11/2002 | Papadopoulos et al. ........ 700/83 |
| 6,505,341 B1 | 1/2003 | Harris et al. |
| 6,587,884 B1 * | 7/2003 | Papadopoulos et al. ...... 709/230 |
| 6,732,191 B1 * | 5/2004 | Baker et al. ...................... 710/1 |
| 6,963,922 B2 * | 11/2005 | Papadopoulos et al. ...... 709/230 |
| 7,058,693 B1 * | 6/2006 | Baker, Jr. ...................... 709/217 |
| 7,146,408 B1 * | 12/2006 | Crater et al. .................. 709/219 |
| 2001/0003804 A1 * | 6/2001 | Papadopoulos et al. ........ 700/83 |
| 2002/0046221 A1 * | 4/2002 | Wallace et al. ............... 707/513 |
| 2002/0133585 A1 * | 9/2002 | Deming ........................ 709/224 |
| 2002/0156926 A1 * | 10/2002 | Batke et al. ................... 709/250 |
| 2002/0176441 A1 | 11/2002 | Swales et al. |
| 2003/0139821 A1 * | 7/2003 | Papadopoulos et al. .......... 700/9 |
| 2003/0195975 A1 * | 10/2003 | Papadopoulos et al. ...... 709/230 |

FOREIGN PATENT DOCUMENTS

| | | |
|---|---|---|
| DE | 296 00 609 U1 | 3/1997 |
| DE | 296 22 133 | 7/1997 |
| DE | 19704694 | 7/1997 |
| DE | 196 15 093 A1 | 10/1997 |
| EP | 0 542 657 A1 | 5/1993 |
| EP | 0575145 | 12/1993 |
| EP | 0 814 393 A1 | 12/1997 |
| EP | 0 825 506 | 2/1998 |
| EP | 0822473 | 2/1998 |
| EP | 0916466 | 5/1999 |
| JP | 60192447 A | 9/1985 |
| WO | WO 96/31047 A | 2/1996 |
| WO | WO 97/07486 A | 2/1997 |
| WO | WO 97/18636 | 5/1997 |
| WO | 9726587 | 7/1997 |
| WO | 9806033 | 2/1998 |
| WO | WO 98/53581 | 11/1998 |
| WO | 9913418 | 3/1999 |
| WO | 0025183 | 5/2000 |
| WO | WO 00/35238 | 6/2000 |
| WO | WO 01/30130 A2 | 5/2001 |

OTHER PUBLICATIONS

Communication from the European Patent Office including International Search Report from WO 03/079126, mailed Aug. 5, 2003.

Kubota, Y, et al., NTT Human Interface Laboratories, "Proposal of the Robot System With Information Sending Mechanism," Presented at the 14th Annual Conference of the Robotics Society of Japan, Nov. 1-3, 1996, pp. 341-342. (in Japanese w/ English translation included).

Brugger, Peter, "Web Technology in Embedded Computing." *Industrial Computer 97—Special Edition*; Sep. 3, 1997 (in German w/ English translation included).

Williams, Tom, et al., "Java Goes to Work Controlling Networked Embedded Systems," *Computer Design*, Aug. 1996, pp. 36.

Fu, K.S., et al., *Robotics: Control, Sensing, Vision and Intelligence*, Chapter Five: Control of Robot Manipulators: Sections 5.1-5.3.1.

*Automation Strategies*, by Automation Research Corporation, Feb. 1998, pp. 1-32.

Lumpp, Thomas, et al., "Virtual Java Devices Integration of Fieldbus Based Systems in the Internet," Industrial Electronics Society, 1998, pp. 176-181.

Box, Don, et al., "Simple Object Access Protocol (SOAP) 1.1," Retrieved form the Internet: http://www.w3.org/TR/2000/NOTE-SOAP-2-20000508, retrieved on Nov. 10, 2002, 27 pages.

Disk Drive with Embedded Hyper-Text Markup Language Server (IBM Technical Disclosure Bulletin: Dec. 1995) [online], [retrieved on Nov. 9, 2001]. Retrieved using Internet: <URL:http://www.delphion.com/tdbs/tdb?o~95A%2062530.>.

The Trojan Room Coffee Machine [online], [retrieved on Sep. 19, 2001]. Retrieved using Internet: <URL:http://www.cl.cam.ac.uk/coffee/coffee.html>.

Stafford-Fraser, Quentin, "The Trojan Room Coffee Pot A (non-technical) biography" [online], [retrieved on Sep. 19, 2001]. Retrieved using Internet: <URL:http://www.cl.cam.ac.uk/coffee/qsf/coffee.html>.

Stafford-Fraser, Quentin, "The Story of the Trojan Room Coffee Pot A Timeline" [online], [retrieved on Sep. 19, 2001]. Retrieved using Internet: <URL:http://www.cl.cam.ac.uk/coffee/qsf/timeline.html>.

From Web Server to Railroad Layout Interactive Model Railroad [online], [retrieved on Sep. 19, 2001]. Retrieved using Internet: <URL:http://rr-vs.informatik.uni-ulm.de/rr/LayoutControl.html>.

News Interactive Model Railroad [online], [retrieved on Sep. 19, 2001]. Retrieved using Internet: <URL:http://rr-vs.informatik.uni-ulm.de/rr/WhatsNew.html>.

Frequently Asked Questions Interactive Model Railroad [online], [retrieved on Sep. 19, 2001]. Retrieved using Internet <URL:http://rr-vs.informatik.uni-ulm.de/rr/FAQ.html>.

Putman, Frederick A., "Internet-Based Data Acquisition and Control" Sensors; Nov. 1999, pp. 1-5.

Kao, James T, "Remote Microscope for Inspection of Integrated Circuits," MIT Masters Thesis; Sep. 1995, pp. 1-113, pp. 1-113.

Soreide, N.N. et al., "Mosaic access to real-time data from the TOGA-TAO array of moored buoys," Computer Networks and ISDN Systems, Dec. 1995.

About LabCam [online], [retrieved on Nov. 28, 2001] Retrieved using Internet: <URL:http://people.cs.uchicago.edu/~peterp/LabCam/aboutLabCam.html>.

Bibliography [online], [retrieved on Nov. 16, 2001] [Retrieved from Xavier Papers using Internet: <URL:http://www-2.cs.cmu.edu/Groups/xavier/www/papers/html>.

Stafford-Fraser, Quentin, "The Life and Times of the First Web Cam—When convenience was the mother of invention". [online], [retrieved on Sep. 19, 2001]. Retrieved using Internet: <URL:http://www.cl.cam.ac.uk/coffee/qsf/CACM200107.html>.

EDN Access for Design, by Design—Test & Measurement Jun. 6, 1996 [online], [retrieved on Sep. 19, 2001]. Retrieved from EDN—Jun. 6, 1996 Test & Measurement using Internet: <URL: http://archives.e-insite.net/archives/ednmag/reg/1996/060696/12prod4.htm>.

Miscellaneous Web pages and documents from LABTECH High Performance Data Acquisition & Process Control Software—20 Years of Industry Innovation in Real-time PC Measurement and Control [online], [retrieved Sep. 18, 2001] Retrieved from LABTECH—20 Years of Industry Innovation in . . . using Internet: <URL: http://www.labtech.com>.

Goldberg, Ken et al; "Beyond the Web: Excavating the Real World Via Mosaic" [online], [retrieved on Apr. 3, 2001]. Retrieved from Beyond the Web Conference Paper using Internet <URL: http://www.ncsa.uiuc.edu/SDG/IT9...golberg.html>.

Goldberg, Ken et al.; "Desktop Teleoperation via the World Wide Web", University of Southern California, IEE International Conference on Robotics and Automation D-7803-1965-6/95 S400, Jun. 1995, pp. 654-659.

News—aX announces Support for Opto 22 Ethernet B3000 Devices—Sep. 13, 2001 [online], [retrieved on Sep. 24, 2001]. Retrieved from automationX using Internet: <URL:http://www.mnrcan.com/newsdetail.phtml?idno=25>.

aX Process Control [online], [retrieved on Sep. 24, 2001]. Retrieved from automationX Process Control using Internet: <URL:http://www.mnrcan.com/ProcessControl.phtml>.

CD-ROM's in the Microwave—What do you do [online], [Retrieved on Jun. 20, 2001]. Retrieved using Internet: <URL:http://www.hamjudo.com/notes/cdrom.html>.

Peryt, M. and Momal, F., "Generic Repository and Search Engine for LHC Equipment Test Data," International Conference on Accelerator and Large Experimental Physics Control Systems, 1999, Trieste, July, pp. 493-495.

Momal, F., et al., "A Control System based on Industrial Components for Measuring and Testing the Prototype Magnets for LHC," [online], [retrieved on Oct. 9, 2001]. Retrieved from A Industrial Control System for Testing the Magnets for LHC using Internet: <URL: http:// mish231.cern.ch/Docs/CS/blC.html>.

Web page [retrieved on Nov. 16, 2001. Retrieved using Internet: <URL:http://www.awe.com/mark/wwwf94/coxfig3.gif>.

Bradford Robotic Telescope—Intro [online], [retrieved on Nov. 15, 2001]. Retrieved from Introduction to the Bradford Telescope using Internet: <URL:http://www.telescope.org/rti/intro.html>.

Cox, Mark and Baruch, John, "Robotic Telescopes: An Interactive Exhibit on the World-Wide Web," [online], [retrieved on Nov. 16, 2001]. Retrieved from Robotic Telescopes Paper using Internet: URL:http://www.awe.com/mark/wwwf94/wwf94.html>.

Welcome to Paul Haas's web server—Welcome to a historic website [online], [retrieved on Jun. 20, 2001]. Retrieved using Internet: URL:http://www.hamjudo.com/notes/cdrom.html>.

Status of Paul's (Extra) Refrigerator at Wed Jun. 20 14:32:09 EDT 2001 [online], [retrieved on Jun. 20, 2001]. Retrieved using Internet: URL:http//www.hamjudo.com/cgi-bin/refrigerator>. Soda Can platform [online], [retrieved on Jun. 20, 2001]. Retrieved using Internet: URL:http//www.hamjudo.com/notes/soda_platform.html>.

Scharf, Ronald et al, "Using Mosaic for Remote Test System Control Supports Distributed Engineering" [online], [retrieved on Mar. 10-21, 2001]. Retrieved using Internet: <URL:http://archive:ncsa.uici.edu/SDG/it94/Proceedings/CSCW/scharf/scharf.html>.

Goldberg, Ken and Mascha, Michael, "Mercury Project Aug. 1994-Mar. 1995," [online], [retrieved on Sep. 2001]. Retrieved using <URL:http://www.usc/edu/dept/raiders>.

Tub status as of Wed Jun. 20 14:44:54 EDT 2001 [online], [retrieved on Jun. 20, 2001]. Retrieved from Paul's Hottub status using Internet: <URL:http://hamjudo.com/cgi-bin/hottub>.

Frequently asked questions about Paul's Hottub [online], [retrieved on Jun. 20, 2001]. Retrieved from hottub notes and sources using Internet: <URL:http://hamjudo.com//hottub-notes.html>.

The Cal Poly Computer Society's Robotics Resources Page [online], [retrieved on Jun. 20, 2001]. Retrieved from Computer Society Robotics Resources Page using Internet: URL:http://www.elee.calpoly.edu/clubs/cs/www/RoboContest>.

The "Only" Coke Machine on the Internet [online], [retrieved on Apr. 10, 2001]. Retrieved using Internet: URL:http://www.cs.cmu.edu/~coke/history_long.txt>.

1771 Control Compressor (Cat. No. 1771-DMC, -DMC1, -DMC4, and -DXPS) User Manual, Copyright 1994, Allen-Bradley Company, Inc., Publication 1771 6.5.95-PM 865119-36, Dec. 1994.

Taylor, Ken and Trevelyan, James, "A Telerobot on the World Wide Web," Proceedings of the 1995 National Conference of the Australian Robot Association, Melbourne, Jul. 5-7, Sydney: Australian Robot Association Inc., pp. 108-118.

Taylor, Ken and Trevelyan, James, "Australian Telerobot on the Web," 26th International Symposium on Industrial Robots, 1995, pp. 40-44.

WWWF94'94 Information Form, Sep. 1, 1994, 3 pages.

Xavier has a new job! [online], [retrieved on Nov. 15, 2001]. Retrieved using Internet: URL:http://www-2.cs.cm.edu/Groups/xavier/www>.

Article entitled, "Installing and Using LABTECHnet," 2 pages.

Article entitled, "LABTECHnet Frequently Asked Questions Updated Sep. 16, 1995," 3 pages.

Putnam, Fredrick, "LABTECH News: Another superlative PR article!!!.," Oct. 26, 1995, 2 pages.

Purham, Frederick, "Public-domain IPC scheme moves Windows data 1000 times faster than DDE," Personal Engineering and Instrumentation News—Oct. 20, 1994, 15 pages.

Strauss, Richard, three page memo to LABTECH staff, with attached press release—For Release on Oct. 3, 1995 entitled, "Internet Goes Real-time with LAHBTECHnet," 3 pages.

Putnam, Frederick, "LABTECHnet Visualization of a Weather Front," 4 pages.

Abstract of "Implementing distributed controls for FMC's using Internet utilities," S. S. Jagdale and N. Merchant; Computers of Industrial Engineering, vol. 31, No. 1-2, p. 87-90; Oct. 1996 (UK).

Abstract of "Process control takes to the Net," G. Paula; Mechanical Engineering, vol. 118, No. 12, p. 55, Dec. 1996.

Abstract of "Remote interrogation and control of sensors via the internet," Peter L. Furh and Euan F. Mowat; Sensors, vol. 12, No. 12, 6 pp; Dec. 1995.

Abstract of "Implementation of CAN/CAN bridges in distributed environments and performance analysis of bridged CAN systems using SAE benchmark," H. Ekiz, A. Kutlu and E. T. Powner; Conference Paper, IEEE Southeastern '97, Engineering the new energy, IEEE, p. 185-7, 1996.

Abstract of "Managing interdisciplinary project teams through the Web," R. E. Goodman and P. Chinowsky; Conference Paper, WebbNet 96—World Conference of the Web Society, pp. 180-185, 1996.

Abstract of "Learning environment for a process automation system using computer networks," J. Lindfors, L. Yliniemi and K. Leivska; Conference Paper, Step '96—Genes, Nets and Symbols, pp. 137-143, 1996 (Finland).

Abstract of "Distributed agent systems for intelligent manufacturing,"D. H. Norrie and B. R. Gaines; Canadian Artificial Intelligence, No. 40, p. 31-3, Autumn 1996 (Canada).

Abstract of Proceedings of AUTOFACT 1995 Conference, "Today's Automated, Integrated Factory," Soc. Manuf., Eng., Dearborn, MI; 1995.

Abstract of "The ECOSSE Control HyperCourse," C. M. Merrick and J. W. Ponton; Computers & Chemical Engineering, vol. 20, Part B, p. S 1353-8, 1996 (UK).

Abstract of "Chemical-better batch controls," T. Crowl; Control & Instrumentation, vol. 28, No. 5, p. 53-4, May 1996 (UK).

Abstract of "Industrial software does 32-bit Windows, prepares for the net," W. Labs; I 8CS, vol. 69, No. 3, p. 23-6, 31-4, Mar. 1996, USA.

Abstract of "A case study for international remote machining:" G. C. I. Lin and Kao Yung-Chou; Conference Paper, Proc. SPIE-Int. Soc. Opt. Eng., vol. 2620, p. 553-60, 1995.

Abstract of "Standardization of long-distance protocols," R. Dinges; Journal Paper, Generation Changes in Network Conductor Systems, ITG—Fachberichte, vol. 134, p. 97-113, 1995 (West Germany).

Abstract of "Control system design V. Communications orchestrate process control," F. Glow; In Tech, vol. 36, No. 9, p. 68-74, Sep. 1989.

Abstract of "Functions and characteristics of local networks adapted to industrial applications," J. Morlais; Electronique Industrielle, No. 97, p. 56-63, Nov. 15, 1985; France.

Abstract of "Intelligent supervisory control of submerged-arc furnaces," Markus A. Reuter, Carla Pretorius, Chloe West, Peter Dixon and Morne Oosthuizen, JOM vol. 48, No. 12, Dec. 1996, p. 49-51.

Abstract of "Simulation on the integration of process control systems of rolling mill plants through standard networks,"Choo Young Yeol, Hwang Hwa Won and Kim Cheeha, Proceedings of the Industrial Computing Conference, Instrument Society of America, Research Triangle Park, NC, USA. p. 1-14; vol. 6, No. 1, 1996.

Abstract of "Environmental waste control digest," Clayton H. Billings; Public Works vol. 127 No. 7, 6 pp, Jun. 1996.

Abstract of "Experiments in tele-handling and tele-machining at the macro and micro scales, using the Internet for operational environment transmission," Mamoru Mitsuishi, Toshio Hori, Tomoharu Hikita, Masao Teratani, Takuro Watanabe, Hirofumi Nakanishi and Bruce Kramer; IEEE International Conference on Intelligent Robots and Systems vol. 2, 1995.

Abstract of "A phototyping and reverse engineering system for mechanical parts-on-demand on the national network," Fred Hansen, Elias Pavlakos, Eric Hoffman, Takeo Kanade, Raj Reddy, Paul Wright; Journal of Manufacturing Systems, vol. 12 No. 4, p. 269-281; 1993.

Abstract of "Mathematical model and optimization of furfural treating process," Tao Peng, Jinshou Yu and Huihe Shao; Huadong Huagong Xueyuan Xuebao/Journal of East China Institute of Chemical Technology vol. 17 No. 1, p. 99-104; Feb. 1991.

Abstract of User's Aspect of Telecommunication and Information Processing in Plant Factory; Hashimoto Yasushi (1); Journal of the Institute of Electronics, Information and Communication Engineers, vol. 78, No. 5, p. 475-81, Fig. 3, Ref. 7, 1995. (Japan).

Abstract of "High-efficient application technology of DCS from the viewpoint of users," Oka Norihito (1); Narita Tsutomu (1); (1) Yamatake-Honeywell Co., Ltd.; Otomeshon, vol. 40, No. 2, p. 24-28, Fig. 5, Part 2, 1995. (Japan).

Abstract of "Users' experience with software tools for process integration. General results" Stougie, L.; Roeterink, H.J.H.; Van Wijk, A.; Stikkelman, R.M.; Nov. 1996.

Abstract of "Integrated design and process technology. vol. 1" Cooke, D.; Kraemer, B.J.; Sheu, P.C.Y.; Tsai, J.P.; Mittermeir, R.; Society for Design and Process Science, p. 51-57; 1996. (USA).

Abstract of "Integrated design and process technology. vol. 2" Tanik, M.M.; Bastani, F.B.; Gibson, D.; Fielding, P.J.; Society for Design and Process Science, p. 423-430, 1996. (USA).

Abstract of "Integrated design and process technology. vol. 2" Tanik, M.M.; Bastani, F.B.; Gibson, D.; Fielding, P.J.; Society for Design and Process Science, p. 306-312, 1996.

Abstract of "Need low-cost networking consider DeviceNet," W. H. Moss; InTech vol. 43:11; p. 30-31, Nov. 1996.

"Plastic Car Bodies Pass the Crash Test," mechanical engineering vol. 118, No. 12; Dec. 1996.

http://www.adeptscience.com/archive_pressroom/html/labtechnet. html; Adapt PressRoom Archives. A collection of Adept Scientific's archive news releases. "Hot Coffee on the Internet!".

When Technology Standards Become Counterproductive, Kenneth C. Crater, President, Control Technology Corporation, Hopkinton, MA dated Jul. 9, 1999, pp. 1-5.

A White Paper State Language for Machine Control, Kenneth C. Crater, President, Control Technology Corporation, Hopkinton, MA dated Jul. 9, 1999, pp. 1-11.

New PC-based Process Control & Data Acquisition Software Integrates Remote Internet Capabilities with Fast Pentium Support, Fred A. Putnam, LABTECH President, pp. 1-3.

Aug. 1996 Control Magazine—In the News B Electric Utility Industry Embarks on Automation Overhaul, pp. 1-10.

Jul. 1997 Control Magazine B Magazine Software Review B NT Package Give Plant Access Through the Web, pp. 1-3.

Oct. 1996 Control Magazine B Software Review—Article Archives, pp. 1-2.

ICS Instrumentation & Control Systems B Windows NT for real-time control: Which way to go?—ICS Magazine, pp. 1-8.

I&CS Jul. 1999—Special Report Software—Software: Open source OSs, objects, Web-based communications challenge status quo, (Wayne Labs, Senior Technical Editor), pp. 24-49.

Landis & Staefa MS 2000, pp. 1-2.

Landis & Staefa Standards and Open Protocols Integration System Architecture, p. 1.

Annabooks Bookstore, Programming and Interfacing the 8051, by Sencer Yeralan and Asutosh Ahluwalia, pp. 1-2.

SoftPLC Corporation—Java Support in SoftPLC Corp. Products, pp. 1-5.

Mach J. Company, MackJ, an embeddable, clean room Java Virtual Machine, p. 1.

SoftPLC Corporation—The History of Programmable Controllers, Looking Back From the Year 2000 A.D. (Or, How Computers Replaced Proprietary PLC'S), pp. 1-7.

SoftPLC Corporation—TOPDOC: Advanced PLC program development & documentation software, pp. 1-12.

Control Engineering Online Magazine Articles (Jul. 1998)—No, that's not a PC, it's a PLC, pp. 1-2.

Rockwell International Corporation, Allen-Bradley Introduces PLC-5/80E Controller for Ethernet Communication Networks, pp. 1-2.

Rockwell Automation—Search Results, pp. 1-2.

Rockwell International Corporation, Vision & Direction, The Direction of Automation Systems, pp. 1-4.

Rockwell International Corporation, Vision & Direction, The Role of Open Systems, pp. 1-4.

Rockwell International Corporation—Vision & Direction—The Direction of Automation Systems—Emergence of Application-Specific Control Solutions, pp. 1-2.

Rockwell International Corporation—Vision & Direction—The Direction of Automation Systems—The New Factory Worker, pp. 1-2.

Rockwell International Corporation, Vision & Direction, Control System Deliverables—The Next Step, pp. 1-2.
Rockwell International Corporation, Vision & Direction, Conclusion & Acknowledgments, pp. 1-2.
Rockwell International Corporation—Choices—Perspectives on the Future of Automation Control, p. 1.
Rockwell International Corporation—Allen-Bradley—Networks—Ethernet for Industrial Control—An Ethernet White Paper—Apr. 21, 1998, pp. 1-13.
Rockwell International Corporation—Automation Systems Control—General—World-Class Automation Systems from Allen-Bradley, Last Updated: May 7, 1998, pp. 1-12.
PC QUEST, Dec. 1997—Point, click, Control—C-Programmable controllers take the pain out of embedded control, pp. 1-2.
Berthel—automation with imagination—PCI 100—Programmable logic controller for SIMATIC/IBM IPC, pp. 1-3.
YAHOO! Personalized Search Results for programmable logic controller internet access, pp. 1-3.
SIEMENS—SIMATIC report Jan. 1997—New in the SIMATIC Library, pp. 1-2.
Control Magazine Aug. 1998 B Field Test—Dynamic Software Makes Control Integration Easier, pp. 1-2.
Design and Reuse Web Site—EDTN Network—Analyze IP Database Content—Analyze Reuse Blocks per taxonomy tree, pp. 1-10.
Engineering Information, Inc.—Ei CPX Web [1990-94].
Using World Wide Web for Control Systems, F. Momal, C. Pinto-Pereira, AT Division CERN, 1211 Geneva 23,http://mish231.cern.ch/Docs/ICALEPCS/1995/icalep95.htm.
"Ethernet Base Gateway Product," AEG-Modicon, published 1991.
"Modicon Modbus Plus Network BM85 Bridge Multiplexer User's Guide," Groupe Schneider, Aug. 1995.
"Modicon Modbus Plus Network Planning and Installation Guide," AEG Schneider Automation, Apr. 1996.
"Open Modbus/TCP Specification," A. Swales, Sep. 3, 1997.
"MEB Installation and Programming Manual," Niobrara Research and Development Corporation, Sep. 24, 1997.
"MEB-TCP Installation and Programming Manual," Niobrara Research and Development Corporation, Oct. 1, 1997.
"Internet Protocol, Darpa Internet Program, Protocol Specification—RFC:791," Defense Advanced Research Projects Agency, Sep. 1981.
"Transmission Control Protocol, Darpa Internet Program, Protocol Specification—RFC:793," Defense Advanced Research Projects Agency, Sep. 1981.
"[comp.unix.programmer] Unix-Socket-FAQ for Network Programming," Vic Metcalfe, Andrew Gierth and other contributors, Jan. 22, 1998.
"TCP/IP Illustrated, vol. 2, The Implementation," Gary R. Wright, W. Richard Stevens, 1997.
"Winsock 2 Information," Bob Quinn, 1995-1998 (last updated Dec. 5, 1998).
Website Information of PROFIBUS: Technical Overview.
Website Information of ODVA—The Open DeviceNet's Vendor Association.
Website of PROFIBUS International—Welcome Page.
LabVIEW Graphical Programming for Instrumentation, Networking Reference Manual, 8 Copyright 1993, 1994 National Instruments Corporation, Part No. 320587B-01, Sep. 1994.
LabVIEW Graphical Programming for Instrumentation, Tutorial for Windows, 8 Copyright 1993, 1994 National Instruments Corporation, Part No. 320593B-01, Sep. 1994.
LabVIEW Graphical Programming for Instrumentation, Data Acquisition VI Reference Manual for Windows, 8 Copyright 1992, 1994 National Instruments Corporation, Part No. 320536B-01, Sep. 1994.
RFC 1533 "DHCP Options and BOOTP Vendor Extensions", (http://ietf.org/rfc/rfc1533.txt) IETF, Oct. 1993.
RFC 1534 "Interoperation between DHCP and BOOTP", (http://ietf.org/rfc/rfc1534.txt) IETF, Oct. 1993.
RFC 2131 "Dynamic Host configuration Protocol" ((http://ietf.org/rfc/rfc21231.txt) IETF, Mar. 1997.
SOAP, Simple Object Access Protocol (1.1) W3C Note May 8, 2000, (http://www.w3.org/TR/2000/NOTE-SOAP-20000508.
Statement of Ken Crater pertaining to awareness of LABTECHnet technology, 1 page.

SOAP, [online], [retrieved on Aug. 5, 2002]. Retrieved from MSDN Online—Default Home Page using Internet <URL:http://msdn.miscrosoft.com/nhp/ default.asp?contentid=28000523&frame=true>.
PROCOMM Plus—The Leader in terminal emulation, [online], [retrieved on Jan. 13, 2002]. Retrieved from the consumer web page of Symantec, Inc. using Internet <URL:http://www.symantec.com/procomm>.
DEC Terminals—The DEC VT100 and Its Successors, [online], 1999 Richard Shuford, [retrieved on Jan. 13, 2002]. Retrieved from DEC Video Terminals—The VT100 and Its Successors using Internet <URL:http://www.cs.utk.edu/~shuford/terminal/dec.html>.
NetReach™ Model TPS-2, TelnetPower Switch 2001, [online], [retrieved on Jan. 13, 2002]. Retrieved from Model TPS-2 Telnet + Dial-Up Remote Power Manager, Remote Reboot of Servers, Route . . . using Internet <URL:http://www.wti.com/tps2.htm>.
ANSI.SYS, [online], [retrieved on Jan. 13, 2002]. Retrieved from ANSI.SYS—ansi terminal emulation escape sequences using Internet URL:http://enterprise.aacc.cc.md.us/~rhs/ansi. html>.
Skonnard, Aaron, "SOAP: The Simple Object Access Protocol," [online], [retrieved on Jul. 30, 2002]. Retrieved from SOAP: The Simple Object Access Protocol—MIND Jan. 2000 using Internet <URL: http://www.microsoft.com/Mind/0100/soap/soap.asp>.
Extensible Markup language (XML)—W3C Working Draft 07—Aug. 1997, [online], [retrieved on Aug. 1, 2002]. Retrieved from Extensible Markup Language (XML) website using Internet <URL:http://www.w3.org/TR/WD-xml-970807.htm>.
Remote Interrogation and Control of Sensors via the Internet, Sensors and Systems; Peter L. Fuhr and Euan F. Mowat; University of Vermont; pp. 25-30; Dec. 1999.
Multi-Tech Systems Granted Modem Firmware Upgrade Patent, Apr. 5, 2000, [online], [retrieved on Jan. 3, 2002]. Retrieved from Multi-Tech Press Release using Internet <URL:http://www. multitech.com/NEWS/releases/2000/183.html>.
Walid Mostafa, Mukesh Singhal, "A Taxonomy of Mulicast Protocols for Internet Applications," Jul. 18, 1997 from Computer Communications 20 (1998) 1448-1457.
Tilo Klesper, "Der Internet-Zugriff aufs LON," Aug. 1998 from Automatisieren.
David J. Preston, "Internet Protocols Migrate to Silicon for Networking Devices" from Electronic Design, Apr. 14, 1997.
IEEE Std 802.11a-1999 (Supplement to IEEE Std 802.11-1999) "Part 11: Wireless LAN Medium Access Control (MAC) and Physical Layer (PHY) specifications Higher-speed Physical Layer in the 5 GHz Band" [Adopted by ISO/IEC and redesignated as ISO/IEC 8802-11:1999/Amd 1:2000(E)].
P802.1p/D4 Sep. 6, 1966 "P802.1p Standard for Local and Metropolitan Area Networks—Supplemental to Media Access Control (MAC) Bridges: Traffic Class Expediting and Dynamic Multicast Filtering".
File History for European Opposition Application No. 98945981.3-2201.
File History for European Opposition Application No. 00982507.6-1244.
File History for European Opposition Application No. 01916149.6-2206.
A TCP/IP Tutorial, RFC1180, Jan. 1991, 25 pages, http://www.dbg.rt.bw.schule.de/faecher/info/rfc/rfc1180.txt, printed Jul. 18, 2006.
Bachmann, Control Systems of the New Generation M1, G. Bachmann Electronic GmbH, Oct. 1997, 12 pages.
Control Engineering of Apr. 19, 1997.
Control Engineering of May, 1997.
Protocol Stack Definition from Wikipedia, http://en.wikipedia.org/wiki/Protocol_stack, printed Jul. 6, 2006, 2 pages.
Dubbel: "Taschenbuch Wu-den Maschinenbau", 20. Auflage, Springer, 2001.
Ethernet MMS Modules for Modicon TSX Quantum User Manual (840 USE 453 00), 1. Sep. 1997, 4 pages.
Ethernet Supporter Function PC; published in 1992.
Ethernet Supporter Function PC; published in 1992, English translation of No. 11 above.
Factory Cast User's Guide for Quantum and Premium 890 USE 152 00 Version 2.0, Schneider Electric, 1999, 245 pages.

Feature Analysis, Dec. 8, 2006, 1 page.

Force Computers, "BusNet: An Open Backplane Communications Protocol", Jun. 1997, 4 pages.

Gower et al.: A flexible, distributed architecture for semiconductor process control and experimentation; SPLE, Proceedings, 2912, Nov. 20, 21, 1996, MIT, 13 pages.

Hütte: "Die Grundlagen der Ingenieurwissenschaften", 30. Auflage, Springer, 1996, 9 pages.

IEC 61375-1, pp. 62-63, http://domino.iec.ch/webstore.nsf/artnum/025341, printed Jul. 7, 2006.

Inter-/Ethernet Products Offer Platform Independence, Distributed Control, in: Control Engineering (Zeitschrift), Mai 1997, Seiten 21-24.

Kennedy: Changing the Face of Mobile Networking; IEEE, 1996, 7 pages.

Leseabschrift der Merkmalsanalyse von Anspruch 1, 1 page.

Marscholik, "Internet-Fahigkeit von embedded Systemen", Design & Elektronik 6, Mar. 25, 1997, 4 pages.

McIlrath et al.: Architecture for Distributed Design and Fabrication; SPTE Proceedings 2913, 1996, 11 pages.

Modbus Definition, at http://www.answers.com/topic/modbus-1; printed Jul. 14, 2006, 1 page.

Modicon Quantum Automation Series Hardware Reference Guide (840 USE 100 00), 12 pages.

Modicon Quantum Ethernet Web Embedded Server Module User Guide 840 Use 115 00 Version 1.0, Schneider Automation, 1997, 105 pages.

Noe Update User Guide, 840 USE 107 00 Version 3.0 1997 Schneider Automation Inc., 1997, 119 pages.

O. Neufang (Hrsg.), Lexikon der Elektronik, 1983, 3 pages.

Protocols and Protocol Stacks, http://www.citap.com/documents/tcp-ip/tcpip008.htm; printed Jul. 6, 2006, 4 pages.

Protokoll vom Apr. 12, 1996 mit Schreiben vom Apr. 16, 1997 der Oskar Frech GmbH & Co zum Besprechungstermin zwischen Fa. G. Bachmann Electronic GmbH und Fa. Oskar Frech GmbH & Co vom Nov. 29, 1996, 5 pages.

* cited by examiner

SYSTEM AND METHOD FOR INTERFACING WITH A CONTROLLER

RELATED APPLICATIONS

This application is a continuation of U.S. patent application Ser. No. 10/097,390, filed Mar. 14, 2002, now abandoned entitled "System And Method For Accessing Devices In A Factory Automation Network," which is a continuation-in-part of U.S. patent application Ser. No. 08/927,005, filed Sep. 10, 1997, entitled "Web Interface To A Programmable Controller," now U.S. Pat. No. 6,282,454, issued Aug. 28, 2001; this application is also related to the following commonly assigned applications: "Web Interface To A Programmable Controller," U.S. patent application Ser. No. 09/738,445, filed Dec. 15, 2000, now U.S. Pat. No. 6,484,061, issued Nov. 19, 2002; and "Apparatus for Controlling Internetwork Communications," U.S. patent application Ser. No. 08/926,837, filed Sep. 10, 1997, now U.S. Pat. No. 6,321,272, issued Nov. 20, 2001—the contents of these Applications are expressly incorporated herein by reference.

TECHNICAL FIELD

Applicants' invention relates generally to the field of programmable controllers and more particularly to a system for coupling a network of programmable controllers through an internetwork to a monitoring and control device.

BACKGROUND ART

Remote monitoring and control of systems and processes have taken many forms. In the past, dedicated lines became the most common form of communication between a control system and a remote location. This has limited application since the control system was not accessible from multiple locations. Modems have made it possible to access the control system from different locations, but these types of systems are generally restricted to downloading and uploading data files. Providing any type of control function between locations is rather limited in this type of environment. Further, an end user generally required a customized interface to access the control system.

With the growth of Internet, and its World Wide Web providing a delivery platform for organizing Internet data through hypertext links, a client server system can be designed that will give each end user the same type of a user friendly interface with the same universal access to services on the Web. The Web is a network of documents called sites or pages stored on server computers throughout the world. Each page will usually contain text, some type of multimedia offerings such as graphic images, video, or audio, and possible hypertext links to other documents. A browser allows a user to read the pages and interact with the choices associated with it. The browser is a graphical software program that sends commands to the Internet Web site and displays whatever information is available on the page. Various browser programs are commercially available from different manufacturers.

The Internet network employs methods designed to handle thousands of general purpose computers sharing a single cable, and therefore has no ability to differentiate traffic in terms of its purpose or the criticality of its data. The Internet is no longer a network of computers sharing a single cable, but rather a web of interconnected point to point links involving both general purpose stations and specialized infrastructure components such as routers and firewalls.

The type of personal computer or work station used by the end user to connect to the Web is of no regard. Communication over the Internet and other networks requires one of several types of protocols. Protocols such as Internet Protocol (IP) provide for file transfers, electronic mail, and other services. A Sun Microsystem's programming language known as Java, along with Hyper Text Markup Language (HTML) used in designing layouts and graphics for a Web site or page has extended Internet technology such that a Web site can be used for dynamic applications, commonly called applets, that can be downloaded and run by the end user. These applets are interpreted and run within a Web browser and have been generally restricted to word processing and similar uses. Downloading and running applets can be slow in comparison to other types of complied languages. Security rules imposed on a browser and enforced by the underlying JAVA language prevent applets from obtaining certain data from any other device other than the Web server itself.

Programmable logic controllers (PLCs) are widely used in industry and process control. Many manufacturers provide factory automation information using Microsoft Windows and other types of communication networking environments. These networks are usually slow, are not universally accessible and are limited to monitoring and data exchange. Control may be implemented, but since the communication networks are non-deterministic, control is not real time. Specialized industrial networks using proprietary fieldbus alternatives can be very expensive. Conversion products are required to allow information carried over those networks to be visible on a general purpose network. There are significant installation and other deployment costs associated with the existence of such intermediate devices. Firewalls between the Web server and the application are designed to solve problems of security and are not designed for high performance.

It would be desirable to develop an automation control system whereby an user could use general, commercial networks such as the Internet in place of specialized industrial networks to remotely monitor automation control devices such as PLCs.

SUMMARY OF THE INVENTION

Accordingly, the principal object of the present invention is to provide an interface between an industrial control system and a Web browser coupled to a connectionless network such as Internet.

Another object of the present invention is to provide remote access through a Web browser to information and data contained in an industrial control system having a Programmable Logic Controller.

In the preferred embodiment of the invention, the invention allows for easy access over a commercial network such as Internet to information within a programmable logic controller (PLC). Access can be made locally or worldwide using a commercial Web browser. The invention is comprised of a control system of essential elements including, but not limited to a Web interface, a local network, and a network interface to at least one PLC control system running an application program for controlling output devices in response to status of input devices. The Web interface runs Web pages from an Ethernet board coupled directly to the PLC back plane and includes an HTTP protocol interpreter, a PLC back plane driver, a TCP/IP stack, and an Ethernet board kernel. The Web interface provides access to the PLC back plane by a user at a remote location through the Internet. The interface translates the industry standard Ethernet, TCP/IP and HTTP protocols used on the Internet into data recognizable to the PLC. Using this interface, the user can retrieve all pertinent data regarding the operation of the PLC, including PLC configuration, I/O and register status, operating statistics, diagnostics, and distributed I/O configurations. Updates to operating software can also be downloaded through the Internet access.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
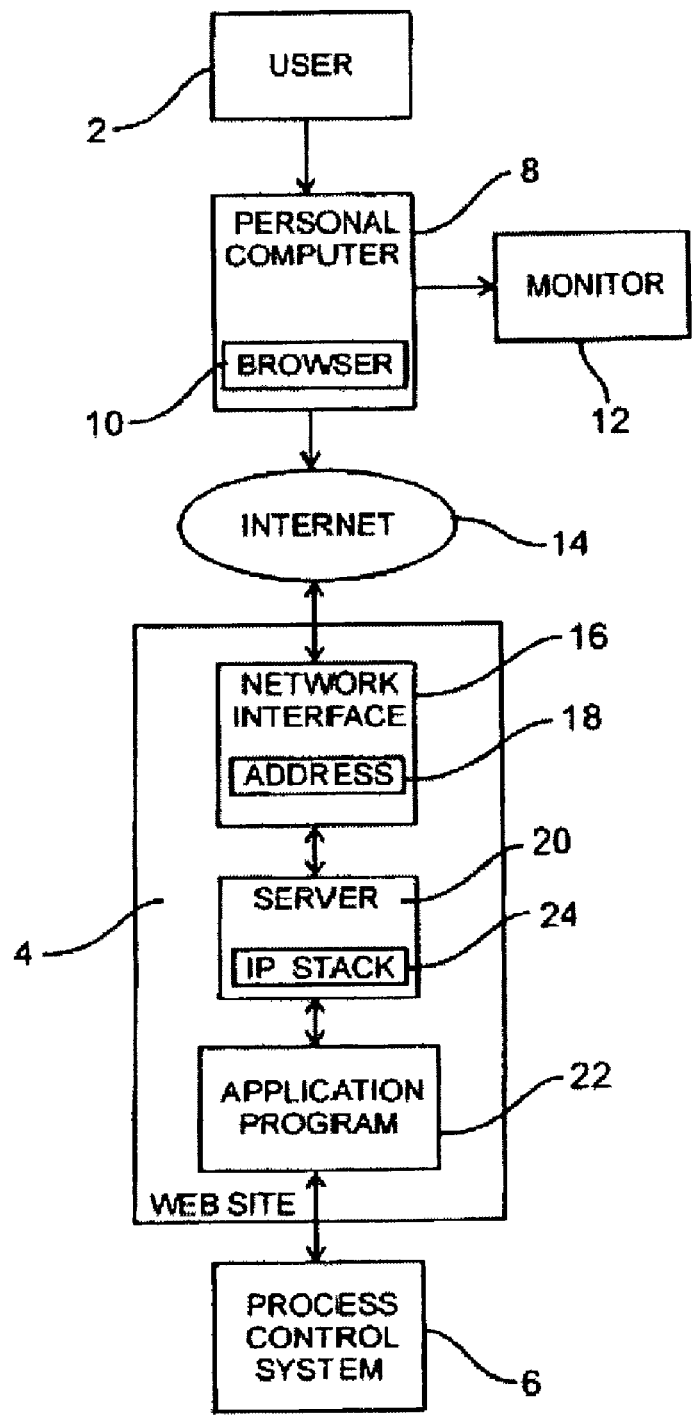
FIG. 1 shows an overview block diagram of a typical system illustrating the relationship between an user at a remote location and an Internet Web site used for monitoring a process control system according to the present invention.

FIG. 1 shows an overview block diagram of typical system illustrating the relationship between an user 2 at a remote location and an Internet web site 4 used for monitoring a process control system 6. The user 2 will have a personal computer (PC) 8 having a commercially available browser 10, such as Netscape Communication's Navigator or Microsoft's Internet Explorer, installed for viewing the contents at the web site 4 by a monitor 12. The PC provides a remote human-machine interface (HMI) to the process control system 6. Various interconnection services are readily available to provide the physical and electrical interconnection from the PC to the Internet 14 itself. The Internet 14 is a collection of independent world wide communication networks that are interconnected to each other and function as a single connectionless entity. Communication is based on a client-server basis, using a number of established protocols that allow for communication and file transfers between the client and the server. The most widely used protocol is Internet Protocol (IP).

The web site 4 includes a network interface 16 having an unique Internet address 18, a server 20, and an application program 22. The server 20 acts as the HTTP interpreter which uses TCP in conjunction with IP, through TCP/IP stack 24 to interact with the network interface 16 and the application program 22. This enables the data transfer between the application program 22 and the user 2 through the Internet 14. The application program provides data from the process control system 6. This data can be used to monitor the control process by the user 2 at the remote location. The TCP/IP stack 24 enables data transfers over the Internet 14 between the user 2 and the web site 4 as required for the various layers specified by the IP protocol.

The user 2 can connect to the Internet 14 using one of a number of Internet service providers and will enter the address of the Web site 4 when connected. The Web site 4 will display a home page which may contain text, some type of multimedia offerings such as graphic images, video, or audio, and possible hypertext links to other documents. The browser 10 will allow the user 2 to read the page and interact with the choices associated with it. The browser 10 will send commands to the Web site 4 which will use the application program 22 to display whatever information is available from the process control system 6. The browser 10 functions as a remote human-machine interface or HMI control of the process control system as will be detailed below.

Figure 2:
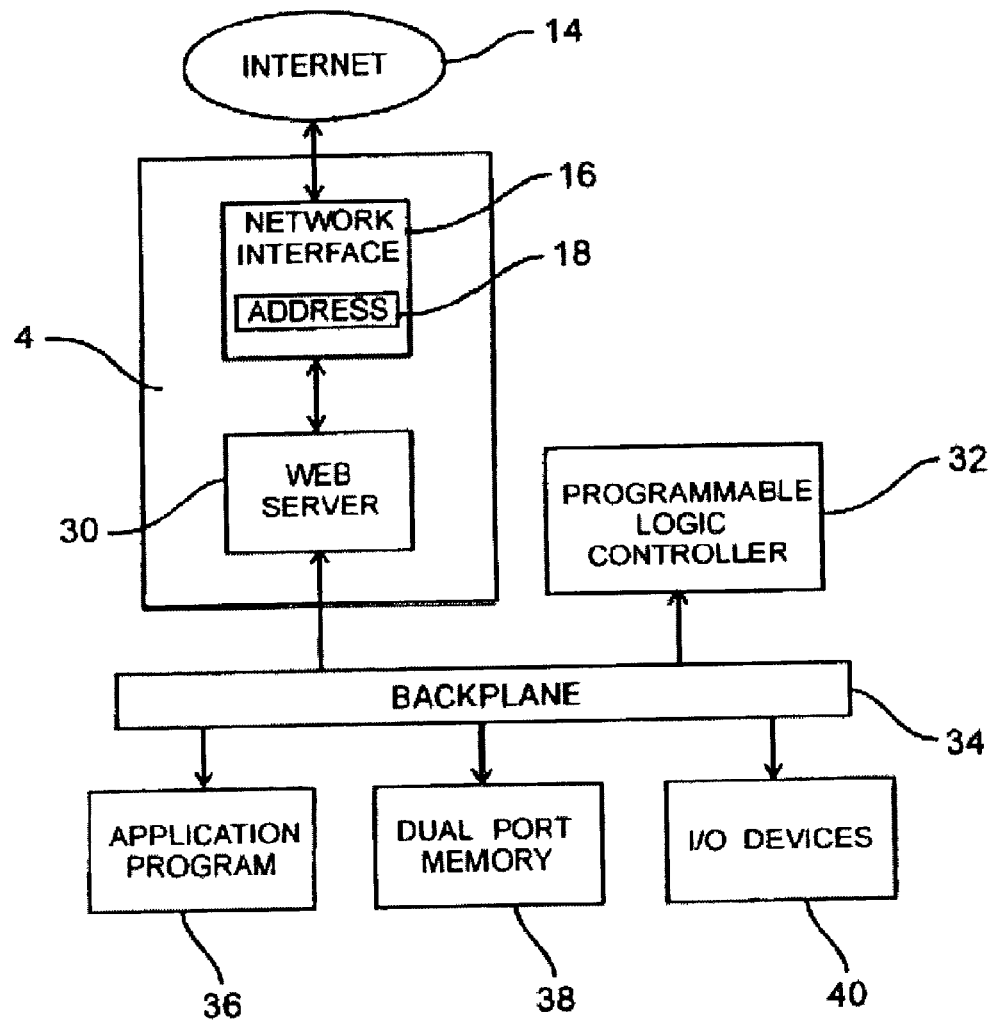
FIG. 2 is a basic block diagram of the present invention illustrating an Internet interface to a programmable logic controller system.

FIG. 2 shows a basic block diagram of the present invention illustrating the Internet interface to a programmable logic controller system. The web site 4 includes the network interface 16 having an unique Internet address 18 and a web server 30. The web server 30 provides the home page for the website. A firewall or security for the overall system can be included in the Web server 30, but is generally maintained as part of the network interface 16. In addition to providing security for various pages at the site, the user can disable the web server 30. A password and user list is provided in initial configuration files stored in the web server 30 that are downloaded from a remote server. Protection of the configuration file is then provided by the remote server and the web server 30 through the password and the user list. The web server 30 provides a direct connection for a programmable logic controller (PLC) 32 to the Internet 14 by plugging the web server 30 into its back plane 34. The web server 30 provides both a client and server interface. All signals between the PLC 32 and the web server 30 are through the back plane 34 rather than over a set of cables which would normally have to be coupled to input/output modules that are themselves plugged into the back plane 34. The back plane signals include addressing, control, data, and power. The client interface allows a user to send commands to a remote node over the Internet and the server interface allows for processing commands that originated from a remote node. Controlling the PLC 32 from a remote HMI, essentially on a real time basis is possible by controlling the data flow through the web server 30.

Associated with the PLC 32 are its application programs 36, dual port memory 38 and I/O devices 40. The application program includes a ladder logic program for controlling the I/O devices 40. The web server 30 functions as a node on a TCP/IP network 42 allowing it to send commands to the PLC 32 and receive the response. Although the TCP/IP network 42 in the preferred embodiment is an Ethernet network, other high level protocols could be used. Using a web browser at a remote location through the Internet 14, a user can control and view configuration information of the PLC 32.

Figure 3:
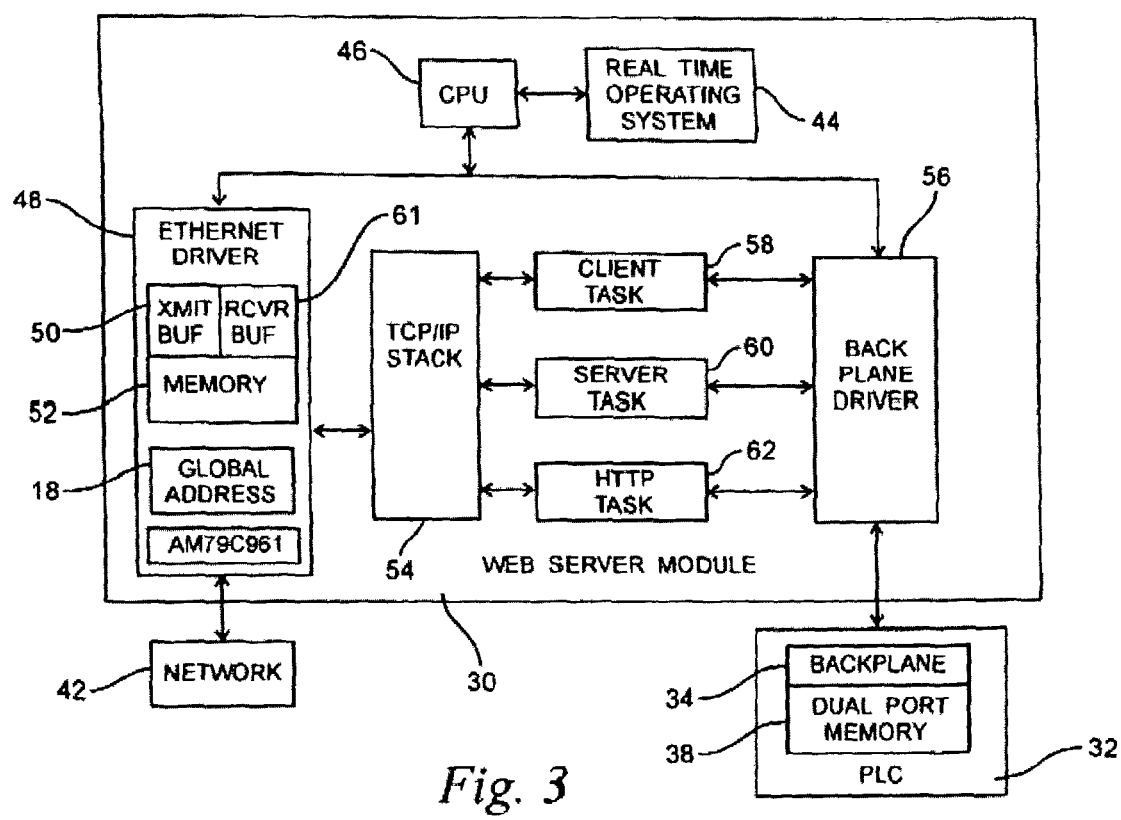
FIG. 3 is a block diagram of the Web server module illustrated in FIG. 2 according to the present invention.

The web server 30 is shown in greater detail in FIG. 3. Various components provide the required connectivity to perform its functionality. A real time operating system 44 controls the interaction between the components. The operating system 44 allocates central processor (CPU) 46 to various tasks, provides memory management, and provides a set of message services and signal services. The message and signal services allow for communication between tasks, and between drivers and a task. Connection to the TCP/IP network 42 is through an Ethernet driver 48 which transmits and receives messages over Ethernet via an Ethernet communication chip such as an AM79C961. The web server will have an unique global address 18, allowing it to be addressed by other devices on the network. Communication can be over a fiber optic cable or a twisted wire pair. The Ethernet driver 48 manages transmit 50 and receive 51 buffers in memory 52, and interfaces with the AM79C961 Ethernet chip. The transmit 50 and receive 51 buffers are shared both by the AM79C961 and the Ethernet driver 48. The Ethernet driver 48 also provides a transmit request interface, and a receive indication interface to a TCP/IP stack 54. The AM79C961 provides a transmit queue interface, a receive queue interface, and generates interrupts on completion of transmitting a message, and on receiving a new message. The Ethernet driver 46 places receive buffers in the receive queue. In the interrupt routine, the Ethernet driver 46 examines the receive queue. If any messages are in the receive queue, it passes the receive buffer to the TCP/IP stack 54. The TCP/IP stack 54 copies the buffer, and sometime later calls the Ethernet driver 48 to return the buffer and place the returned buffer back into the receive queue.

The TCP/IP stack 54 calls the Ethernet driver 48 to transmit a message. The Ethernet driver 46 attempts to allocate a buffer from the shared memory 52. If it succeeds, it copies the message into the buffer, and places the buffer into the AM79C961 transmit queue. If there is no transmit buffer, then the driver drops the transmit message. In the interrupt routine, the Ethernet driver 48 examines the transmit queue, and frees the transmitted buffers.

The TCP/IP network 42 allows special MSTR (master) functions that allow nodes on the network to initiate message transactions. These MSTR functions include reading and writing data and are used for commands and responses. They allow programs running in the PLC 32 to send commands to a remote node on the TCP/IP network 42 and receive the responses A back plane driver 56 sends commands and receives the response to the PLC 32 over the back plane 34.

The back plane driver 56 receives request from the PLC's ladder logic MSTR blocks stored in its memory 38. When a response is available, the back plane driver 56 passes it back to the MSTR block. The back plane driver 56 provides a server 58 and client 60 interface to applications. The server 58 interface allows an application to issue a request command to the PLC's 32 executive program, and receive its response. The client 60 interface allows an application to receive a new MSTR request, and pass back the response to the ladder logic program.

The server 58 interface uses a queuing mechanism and call back functions. An application queues both the request and the call back function associated with the request. When the back plane driver 56 services the request in its interrupt routine, it calls the associated call back function. The response and the original request is passed to the call back function. The call back function can call an operating routine to either pass a message or signal the application.

The client 60 interface also uses queues and call back functions. The client application queues both an indication request on queue and a call back function associated with the request. When the back plane driver 56 detects a new MSTR block request in its interrupt routine, it calls the associated call back function. The request is passed into the call back function. The call back function can call an operating system routine to either pass a message or signal the application. If the back plane driver 56 detects that the MSTR block has been aborted, or is no longer being solved, it calls an user supplied associated abort call back function. The application calls a routine to pass the MSTR response and a associated call back routine to the driver. Sometime later, the driver passes back the response to the ladder logic program in its interrupt service routine, and then calls the user supplied call back function.

The PLC 32 interfaces with the web server 30 hardware via the dual port memory 38. It reads and writes to the dual port memory 38 using an ASIC chip. Writing to a specified location will cause an interrupt. The PLC 32 first writes a message in the dual port memory 38, and then causes an interrupt. The message indicates a type of command. One type indicates that a MSTR block is being solved. Other types are used for passing requests to the PLC 32, and obtaining the responses to the requests. After the PLC 32 passes the message, it polls the dual port memory 38 for commands placed by the back plane driver 56. These commands are read memory, write memory, and processing is complete. The back plane driver 56 uses state machines to process the MSTR interrupts. The maximum number of active MSTR blocks is set at four in the present invention, requiring four state machines. When the back plane driver 56 receives an MSTR interrupt, it attempts to find an associated state machine that matches with the MSTR block. If there are already four outstanding transactions, no more are available, and the back plane driver 56 will set the MSTR's outputs to false. If a state machine is found, the back plane driver 56 determines if it is a new transaction, an outstanding transaction, or a response is available. If it is a new transaction it copies the request, and calls the application's associated call back routine. If its an outstanding transaction, it indicates to the ladder logic program that the MSTR block is still busy. If a response is available, the back plane driver 56 copies the response, sets either the MSTR's completion or error output, and calls the application's call back routine.

Two interrupts are used for processing a request. On the first interrupt, called the preport interrupt, the back plane driver 56 copies the request into a data structure located in the PLC's 32 dual memory 38. On the second interrupt, called the end of scan interrupt, the back plane driver 56 copies the response from the controller's data structure into the user's buffer. It then calls the user's associated call back function.

The request for accessing the PLC's 32 registers is processed by the back plane driver 56, and is not sent to the PLC's executive program for processing. The back plane driver 56 determines the memory location in the memory 38 of the registers the PLC 32. At an end of scan interrupt, the back plane driver 56 processes the read/write register requests by sending commands via the dual port memory 38 to the PLC 32 to read or write the locations containing the registers. The back plane driver 56 will service a maximum of four read/write register requests at the end of a scan interrupt.

A client task 58 interfaces with the TCP/IP stack 54, the back plane driver 56, and uses the operating system 44 message services. It processes the MSTR request. When the client task 58 receives a MSTR request from the back plane driver 56, it passes the request to the TCP/IP stack 54. When the TCP/IP stack 54 returns a response to the client task 58, it passes the response to the back plane driver 56.

The TCP/IP stack 54 provides a Berkeley TCP/IP interface and a signal extension. The signal extension calls a user supplied function which passes in a socket number, a task ID, and an event. The signal function calls the operating system 44 to send a message to the task indicated by the task ID. It sends a message either to the client 58 or server 60 task. The client task 58 posts request indications to the back plane driver 56, and the associated call back routine calls the operating system 44 to send a message to the client task 58 for a new MSTR transaction.

The client task 58 manages multiple outstanding MSTR transactions using the state machines. There is a linked list of connection state machines. The connection state machines are used for establishing connection and closing connections. In addition each connection state machine contains a list of transaction state machines. Each transaction machine on the connection state machine represents a transaction to a node represented by the connection machine. The transaction machines are used to send a request, and process the response. The client task 58 enters a loop after performing initialization. It calls the operating system 44 to receive a message. The operating system will block the client task 58 until there is a message or until there is a time out. It either receives a message from the TCP/IP stack 54, from a MSTR call back routine, or it times out. It processes the message or the time out and then reenters the loop. If the message received from the operating system 44 is a new MSTR request, the client task will obtain a connection state machine, and places a new transaction machine at end of the list of the connection state machine's list. At this point the transaction machine will attempt to transmit the message. It may not be possible to transmit the message because no connection has been established, or the because the remote side may have applied flow control.

If the message received from the operating system 44 is a TCP/IP event, the client task 58 finds the associated connection machine and determines if the TCP/IP event is an accepted connection, an aborted connection, or a received data event. Based on the connection state, and the transaction machine's state, the client task 58 processes the message to advance the transactions if there are any. Receiving data for the MSTR responses may occur over several TCP/IP events, and the transaction state machine assembles the data into a response.

When the client task 58 requests the TCP/IP stack to transmit a message, not all of the message may be transmitted. This occurs when the remote node is flow controlled, which is explained below. If the call to the operating system 44 to receive a message returns with a time out, or if there is a message, the client task 58 searches the list of connection machines that are flow controlled. For each flow controlled connection, it tries to advance the transaction state machines on the connection state machine list that are flow controlled.

The server task 60 processes a request originating from the user at the remote location. The server task 60 interfaces with the back plane driver 56, the TCP/IP stack 54, and the operating system's 44 message services. The server task 60 posts requests to the back plane driver 56, and an associated call back routine uses the operating system 44 message services to send the response to the server task 60. A TCP/IP stack 54 signal function also uses the operating system's 44 send service to send an TCP/IP event to the server task 60. The server task 60 can handle multiple transactions and connections. Like the client task 58, it maintains a list of connection machines, and each connection machine contains a list of transaction machines. The connection machines are for managing the connection and the transaction machines manage the incoming requests and responses.

The server task 60 enters a loop after performing initialization. It calls the operating systems 44 to receive a message. The operating systems 44 blocks the server task 60 until there is a message or until it times out. It either receives a message from the TCP/IP task's 54 signal handler, from the back plane driver 56 or it times out. It processes the message or the time and reenters the loop. If the message received from the operating systems 44 is from the TCP/IP task's 54 signal handler, the server task 60 determines if the event is a connection request, a close socket event, or a receive data event. Based on the TCP/IP event, the server task 60 uses the connection machine and transaction machine to advance the transaction. Received data for a request may occur over several receive data events, and the transaction machine assembles the events into a request message. When the response message is received from the operating system 44, the server task 60 finds the connection and transaction machine in order to send the response.

When the server task 60 requests the TCP/IP stack 54 to transmit a message, not all of the message may be transmitted. This occurs when the remote node is flow controlled. If the call to the operating system 44 is to receive a message returns with a time out, or if there is a message, the server task 54 searches the list of connection machines that are flow controlled. For each flow controlled connection, it tries to advance the transaction state machines on the connection state machine list that are flow controlled.

After the server task 60 has parsed the header of an incoming request, it attempts to allocate a structure to pass the request to the back plane driver 56. If the server task is already processing a predetermined number of outstanding requests, the attempt fails, the connection is placed into a blocked state, and the body of the request is not read from the TCP/IP stack 54. As a result the TCP/IP stack may apply flow control to the remote node. When one of the other requests is complete, the free data structure event causes a blocked connection machine to continue processing the incoming Modbus request.

The HTTP task 62 interfaces with the TCP/IP stack 54, and the back plane driver 56. The HTTP server task 62 receives a HTTP request from the TCP/IP stack 54. To process the request, it may access the PLC 32 through the back plane driver 56 and back plane 34. The HTTP server task 62 sends back the response over the TCP/IP stack 54. The framework is supplied by the operating system 44. The framework creates the HTTP task, accepts connection, and parses the HTTP request. After parsing the request, it calls the operating system 44 to process the request. Processing the request involves determining the request type and processing the actual request. The different request types allow a user to acquire a snapshot of the PLC 32 operations by allowing a view of various registers within the PLC 32 and dual memory 38. These request types also include display of the PLC 32 configuration, remote and distributed I/O and module health statistics, display registers, back plane configuration, Ethernet statistics and others as shown in Table 1:

TABLE 1

Show the home page
Show the programmable logic controller's configuration
Show the Ethernet statistics
Show the read register request page
Show the 4x registers
Show the racks attached to the controllers back plane
Send an image. The different images are gif files that are displayed on the various pages
Show the remote I/O statistics
Show the list of configured remote I/O drops
Show a remote I/O rack's configuration and health
Show a remote I/O drop's communication statistics
Show the I/O reference values of a remote I/O module
Show a list of configured distributed I/O nodes
Show the configuration and the health of a distributed I/O node
Show the I/O reference values of a distributed I/O module The home page contains hyperlinks to seven pages of data. The configuration page will display the configuration of PLC 32. The remote I/O and distributed I/O module health status pages are a series of linked pages. The first page displays the communication health statistics at the Remote I/O and Distributed I/O head and contains a link to a configured drop page. The configured drop page displays a table containing drop numbers which are linked to a drop status page and rack numbers which are linked to the drop and rack configuration pages. Two tables are included in the drop status page, one for showing the communication status of the drop and the other for showing which racks are populated with the I/O modules. The drop and rack configuration page displays the I/O modules, their health, and slot location for the given rack. From a selected module, a user can view it's input and output values. Register data is displayed in a template having a form and a table, with the user entering an address and a length. The table will display the registers values. A table showing option modules and their slot location is displayed on the back plane configuration page. The data appearing on the pages is static but can be automatically updated at preselected times. The operating system 44 processes these requests and responds by sending HTTP messages through the TCP/IP stack 54. Processing some of these requests involves reading the PLC's traffic cop, registers, coils, or various page zero locations where statistics are kept. To perform these reads, the operating system 44 sends a request to the back plane driver 56 and uses an event signal mechanism and event flags to determine when the request is complete. After sending the request to the back plane driver 56, the operating system 44 waits for an event flag to be sent. When the back plane driver completes the request, the back plane driver 56 calls a call back routine, which sets the event. The operating system 44 then resumes processing the request.

Figure 4:
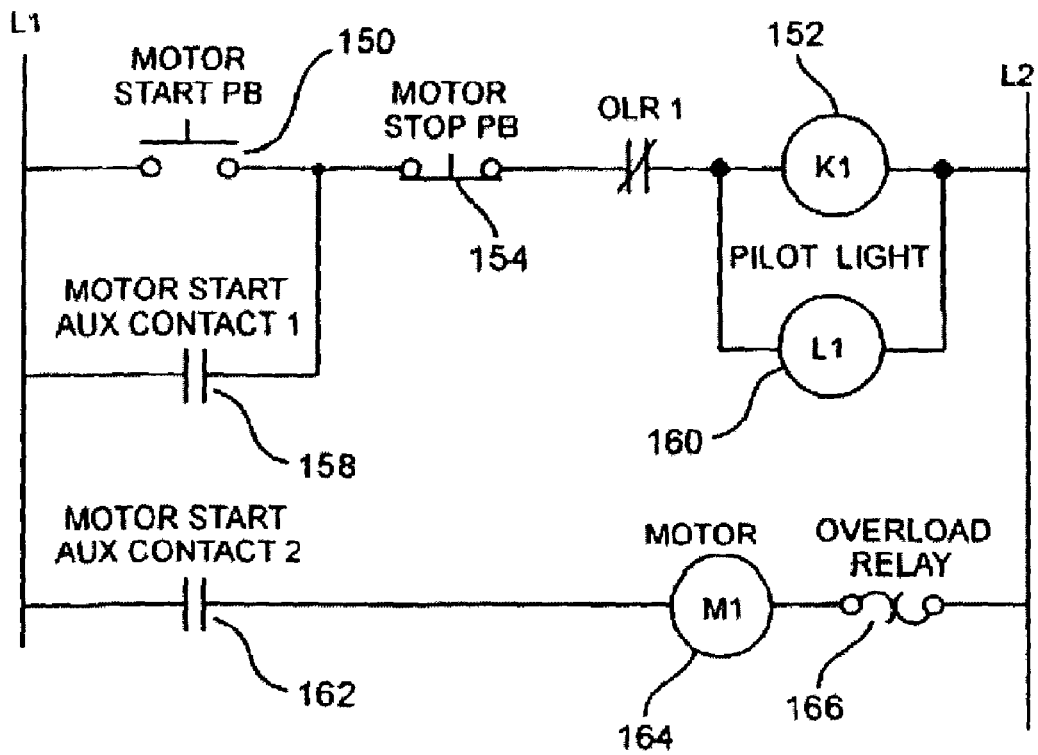
FIG. 4 is a typical mimic page available to a user at a remote location utilizing a browser which illustrates the present invention for monitoring a programmable controller system.
Figure 4:
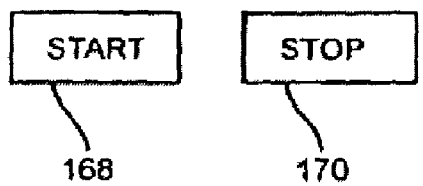

A mimic page which represents some of the hardware physically connected to a programmable logic controller system can be constructed utilizing various graphical programs readily available and that are not an object of the present invention. The present invention allows a user at a remote location, using a browser, to view the mimic page and actually control various components illustrated in the mimic page. FIG. 4 shows a simple motor start-stop control in ladder logic diagram form that could be available as a mimic page to the user. Pushing a motor start push button 150 will cause a motor start relay 152 to energize through a normally closed stop push button 154 and a normally closed overload contact 156. Auxiliary motor start contact 158 will latch relay 152 after the start push button 150 is released and pilot light 160 will illuminate. Auxiliary motor start contact 162 will provide power to pump motor 164 which will remain running until stop push button 154 is depressed or overload relay 166 detects an overload condition. In this example, start push button 150, stop push button 154, overload contact 156, auxiliary motor start contacts 158 and 162, and overload relay 166 are inputs to the programmable logic controller system. Relay 152, pilot light 160, and pump motor 164 are outputs. The PLC will have the registers containing the animation data for the inputs and outputs. An application program in the PLC will respond to the inputs to control the outputs.

A user at a remote location will browse the Internet for the home page of the installation of the programmable logic controller system. The PLC will have other control functions as well and if the user has the necessary authorizations, various options will become available. The home page will allow the user to acquire a snapshot of the PLC operations by allowing a view of various pages that will allow access to registers within the PLC. Other pages will also include displays of the PLC's configuration, remote and distributed I/O modules health statistics, display registers, back plane configuration, Ethernet statistics and others as shown previously shown in Table 1.

The mimic diagram page will be called up on a browser screen which will allow the user to view the status of the system. The mimic diagram's light 160, relay 152, contacts 158, 162, and pump motor 164 will be updated to correspond to the state of the actual devices. The states of the inputs and outputs will then be shown on the ladder diagram which will be automatically updated as they are changed. Through the use of applets representing the start 150 and stop 154 buttons, the user could manually control start and stopping of the motor by using a mouse or keyboard to position a cursor and "clicking" on either the start 168 or stop 170 boxes.

While the specific embodiments have been illustrated and described, numerous
modifications are possible without departing from the scope or spirit of the invention.

We claim:

1. An industrial control system for facilitating communication to a controller having a back plane, the controller being operably connected to a web browser, the system comprising:
    an interface module configured to be operably connected to the back plane of the controller and a network, the interface module including a network identifier and comprising:
    a microprocessor;
    a network driver configured to be operably connected to the network and the microprocessor;
    a back plane driver configured to be operably connected to the controller and the microprocessor, wherein the network driver and the back plane driver cooperate to facilitate communication between the controller and the browser; and
    a protocol stack configured to facilitate communication between the network driver and the back plane driver.

2. The system of claim 1 wherein the communication network is a world-wide network known as Internet using an Internet Protocol (IP).

3. The system of claim 2 wherein the interface module includes a web site on the Internet.

4. The system of claim 1 further comprising a HyperText Transfer Protocol (HTTP) task for facilitating transmission of documents between the back plane driver and the network driver.

5. An industrial control system for facilitating communication to a controller having a back plane, the controller configured to be operably connected to a network and being accessible via a web browser, the system comprising:
    an interface module including a microprocessor, the interface module being operably connected to the web browser and the back plane; and
    a protocol stack configured to facilitate communication between a network driver and a back plane driver, the back plane driver being capable of receiving a data request for accessing data from the controller and for sending a response to the web browser.

6. The system of claim 5 wherein the network is a world-wide network known as Internet using an Internet Protocol (IP).

7. The system of claim 6 wherein the interface module functions as a web site on the Internet.

8. The system of claim 6 wherein the interface module is adaptable for installation in a slot in the back plane of the controller.

9. The system of claim 5 wherein the protocol stack comprises a Transmission Control Protocol (TCP)/IP stack.

10. The system of claim 5 wherein the protocol stack includes HyperText Transfer Protocol (HTTP).

11. The system of claim 10 wherein the data request allows a user via the web browser to view data within the controller.

12. The system of claim 11 wherein the data request further includes a configuration view of the controller and a status of input and output devices operably coupled to controller.

13. An industrial control system for allowing access between a controller and a web browser through a communication network, the system comprising:
   a web browser; and,
   an interface module configured for installation in the controller, the interface module comprising:
      a microprocessor;
      a network interface configured to couple the interface module to the web browser via a communication network;
      a back plane interface configured to physically connect the interface module to a back plane of said controller, the back plane interface configured for communications between the interface module and the controller; and
      a protocol stack configured to facilitate communication between the network interface and the back plane interface.

14. The system of claim 13 wherein the said controller is a programmable logic controller.

15. The system of claim 13 wherein the protocol stack includes a Transmission Control Protocol (TCP)/IP stack.

16. The system of claim 13 wherein the protocol stack includes HyperText Transfer Protocol (HTTP).

17. A method for communicating with a controller via a browser, the controller being configured to run an application program for controlling an output device in response to a status of an input device, the controller having a back plane and being configured to be operably connected to a network via an interface module, the interface module being configured to use the back plane and a protocol stack to communicate with the controller, the protocol stack being configured to facilitate communication between a network driver and a back plane driver in the interface module, the method comprising the steps of:
   accessing the controller via the browser, the access being provided via the interface module; and
   retrieving information from the controller, the information passing through the interface module.

18. The method of claim 17 wherein the information retrieved from the controller includes controller configuration.

19. The method of claim 17 wherein the information retrieved from the controller includes I/O status.

20. The method of claim 17 wherein the information retrieved from the controller includes register status.

21. The method of claim 17 wherein the information retrieved from the controller includes operating statistics.

22. The method of claim 17 wherein the information retrieved from the controller includes diagnostics.

23. The method of claim 17 wherein the information retrieved from the controller includes distributed I/O configurations.

24. The method of claim 17 further comprising the step of facilitating protocol communication between the controller and the browser.

25. The method of claim 17 further comprising the step of transmitting information to the controller from the browser.

26. A method for communicating with a controller via a browser, the controller being configured to run an application program for controlling an output device in response to a status of an input device, the controller having a back plane and being configured to be operably connected to a network via a server, wherein the server includes a protocol stack configured to facilitate communication between a network driver and a back plane driver in the server, wherein communication between the controller and the server only occurs through the back plane, the method comprising the steps of:
   accessing the controller via the browser using the server; and
   controlling the controller using the server.

27. The method of claim 26 further comprising the step of: transmitting a command to the controller through the back plane.

28. The method of claim 27 further comprising the step of: retrieving information from the controller.

29. The method of claim 26 further comprising the step of: providing security for restricting access to the controller.

* * * * *